March 10, 1931.  F. W. JAEGER  1,795,860
TEMPERATURE CONTROL VALVE MECHANISM
Filed May 1, 1929  3 Sheets-Sheet 1
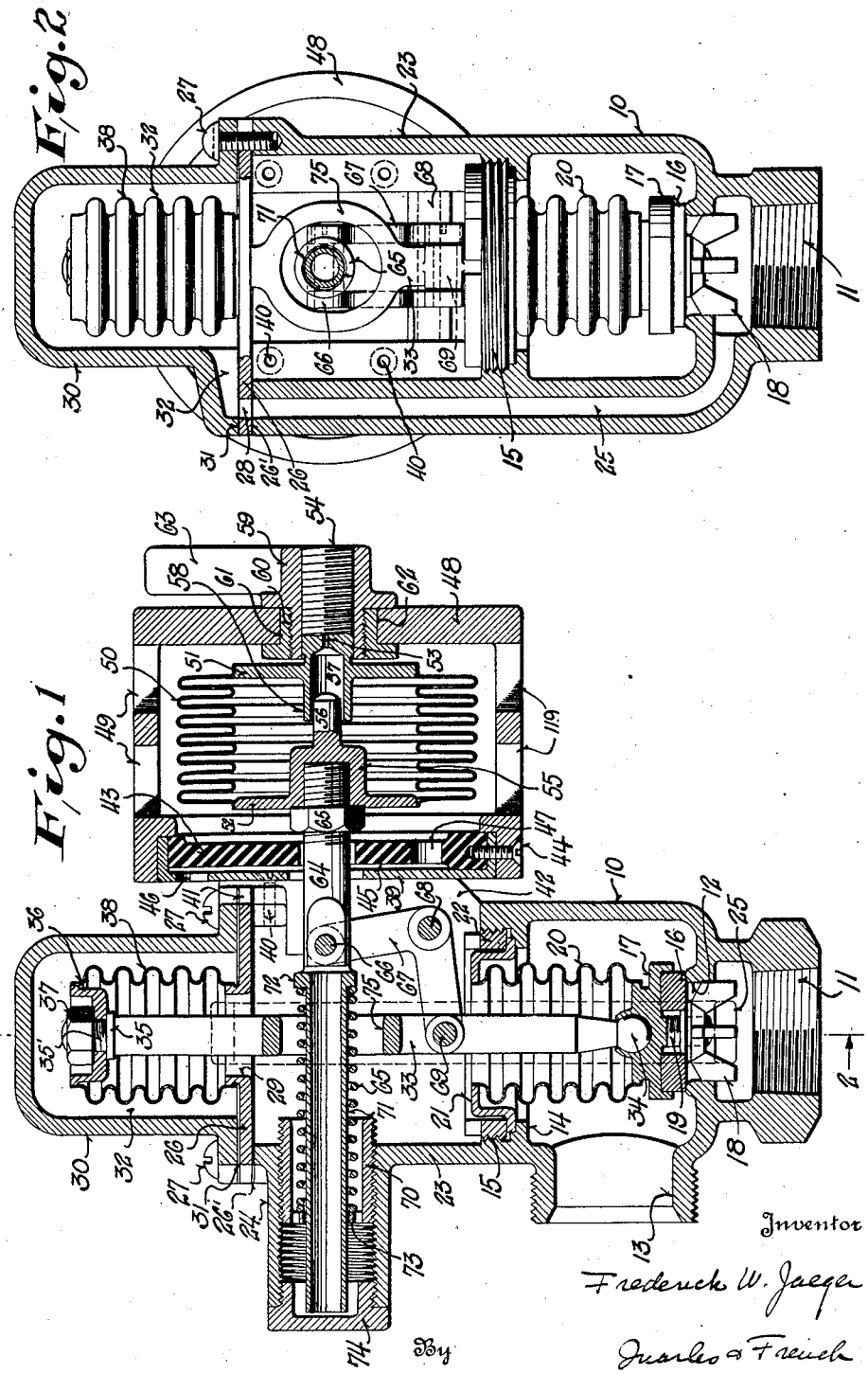
Inventor
Frederick W. Jaeger
By Charles & French
Attorney March 10, 1931. F. W. JAEGER 1,795,860
TEMPERATURE CONTROL VALVE MECHANISM
Filed May 1, 1929   3 Sheets-Sheet 2
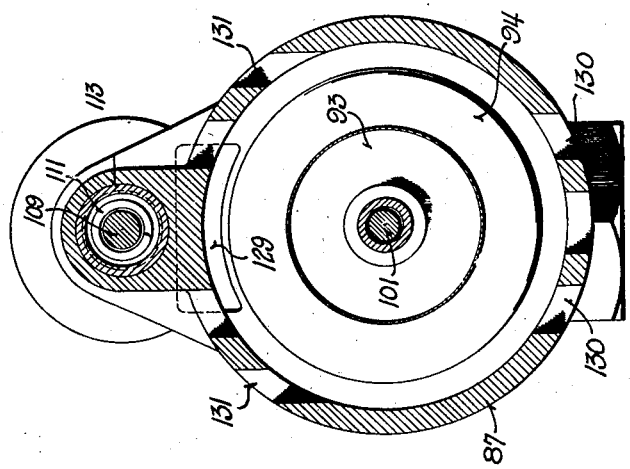
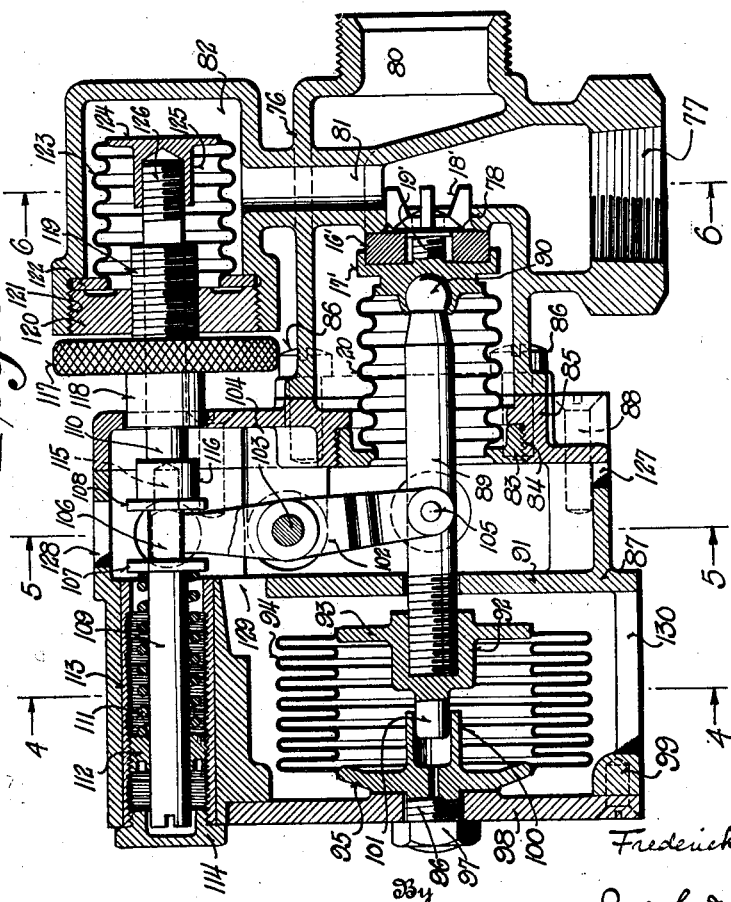
Inventor
Frederick W. Jaeger
By Quarles & French
Attorney March 10, 1931.  F. W. JAEGER  1,795,860
TEMPERATURE CONTROL VALVE MECHANISM
Filed May 1, 1929  3 Sheets-Sheet 3
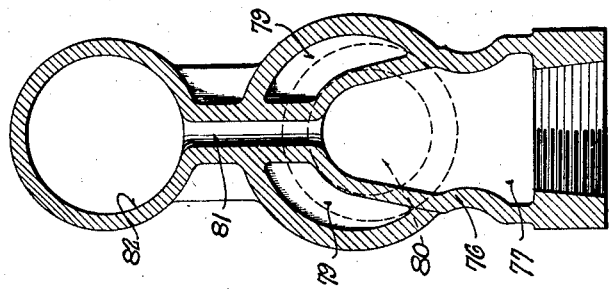
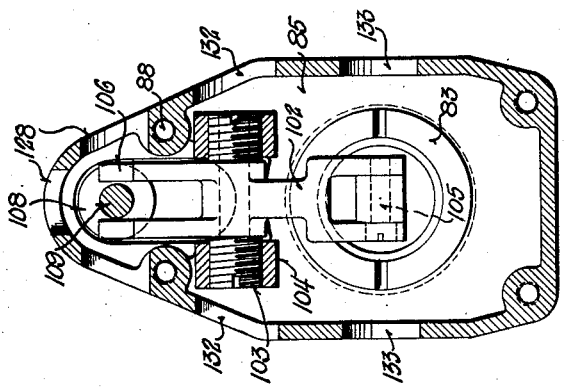
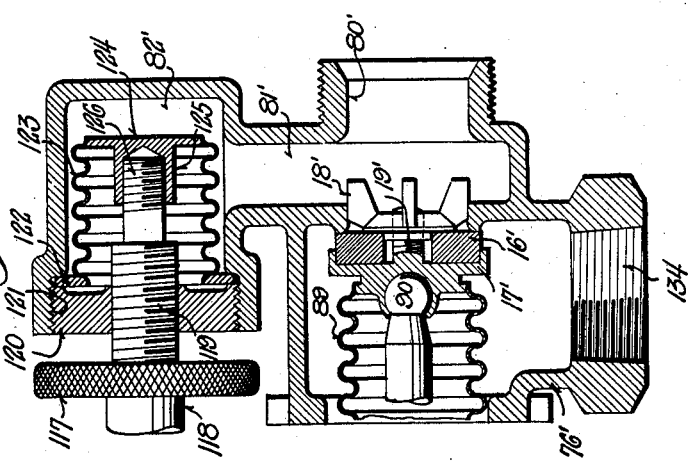
Inventor
Frederick W. Jaeger
By Charles & French.
Attorneys Patented Mar. 10, 1931

1,795,860

UNITED STATES PATENT OFFICE

FREDERICK W. JAEGER, OF MILWAUKEE, WISCONSIN

TEMPERATURE-CONTROL-VALVE MECHANISM

Application filed May 1, 1929. Serial No. 359,596.

The invention relates to thermostatically-controlled temperature regulator valves.

One of the main objects of this invention is to provide a valve of the type used on individual radiators and controlled by a thermo-sensitive element subject to the temperature of the space supplied by heat from the radiator, wherein the valve is truly balanced against pressure acting on it in one direction and preferably balanced against the supply line, and associated with the thermosensitive element to provide a more sensitive operation of the valve than any heretofore devised.

A further object of the invention is to provide simple and effective mechanism for adjusting the valve to operate at the desired temperature.

The invention further consists in the several features hereinafter set forth and more particularly defined by claims at the conclusion hereof.

Referring to the drawings Fig. 1 is a vertical sectional view through the preferred embodiment of the invention;
Fig. 2 is a detail sectional view taken on the line 2—2 of Fig. 1;

Fig. 3 is a detail sectional view through a modified form of device;

Fig. 4 is a detail sectional view taken on the line 4—4 of Fig. 3;

Fig. 5 is a detail sectional view taken on the line 5—5 of Fig. 3;

Fig. 6 is a detail sectional view taken on the line 6—6 of Fig. 3;
Fig. 7 is a detail sectional view similar to Fig. 3, parts being broken away and showing certain modifications.

Referring to Figs. 1 and 2, the numeral 10 designates a valve casing having a threaded inlet opening 11 for connection with the pipe supplying the heating fluid and communicating with the interior of the casing through a valve-controlled port 12, said casing having a laterally disposed passage 13, the walls of which are threaded for attachment to the radiator through the usual union coupling, and an opening alined with the port 12 having an inwardly extending annular flange 14 and a threaded bore portion 15.
A packless valve controls the passage of heating fluid through the port 12 and comprises a valve disk 16 clamped to a head member 17 by a nut 18 mounted on a threaded extension 19 of said head and guided in the port 12, a multiple bellows diaphragm 20 secured at one end to said head member in a fluid-tight manner and at the other end to a flanged ring 21 in a fluid-tight manner, and a spanner-operated nut 22 engaging the threaded bore 15 and clamping said ring in a fluid-tight manner against the flange 14.

The casing 10 has an upwardly extending portion 23 provided with a threaded tubular extension 24 and is open at its top and the side facing the extension, and it also has a pressure-equalizing passage 25 extending from the inlet opening 11 to the top.

A cover plate 26 is secured to suitable bosses formed on the casing 10 by screws 27 and has an opening 28 alined with the passage 25 and a centrally disposed opening 29. A sealing gasket 26' is interposed between the plate 26 and the top of the casing 10.

A casing member 30 is also secured to the plate 26 and the casing 10 by the screws 27, a sealing gasket 31 being interposed between said casing 30 and the plate 26, the interior 32 of said casing being in communication with the opening 28 and passage 25.

The valve has a stem 33 having a universal joint connection 34 with the head member 17 and extending up through the bellows 20, the upper portion of casing 10, opening 29 and into the interior of the casing 30 and provided with a shoulder 35 and threaded end 35'. A disk 36 is clamped against the shoulder 35 by a nut 37 on said threaded end 35'. A multiple bellows diaphragm 38 seals the upper portion of the casing 10 from the interior 32 of the casing 30, said bellows being secured at one end in a fluid-tight manner to the plate 26 and at its other end to the disk 36. With this construction, as the heating fluid acts against the face of the valve and upon the disk 36 through its passage into the chamber 32 and as the area of these parts and the effective area of bellows 38 are equal, the pressures on the valve are balanced.

A flanged metal plate 39 is suitably secured by screws 40 against the side opening of the upper portion of the casing 10 from which it is spaced at certain points to provide vent openings 41 and 42, and a shield 43 of suitable insulating material is mounted within the flanged portion of said plate and secured thereto by screws 44, said shield being spaced from the base of said plate to provide a vent space 45 communicating with vent openings 46 and 47 in said plate and shield, respectively.

An apertured, cylindrical casing 48, having top and bottom vent openings 49, is secured to the plate 39 and has a thermosensitive element mounted therein.

This thermosensitive element comprises a multiple bellows diaphragm 50 secured in fluid-tight manner to end plates 51 and 52 forming a chamber which is charged in known manner with a suitable volatile, heat-sensitive fluid through an opening 53 in a threaded extension 54 of the plate 51, which opening is then suitably sealed. The plate 52 has a boss 55 and a pin 56 projecting therefrom loosely guided in a bore 57 of an inwardly projecting tubular extension 58 of the plate 51.

The extension 54 has a sleeve-nut 59 mounted thereon, having a threaded portion 60 in engagement with a flanged collar 61 rotatably mounted in an opening 62 in the casing 48, and also has a laterally extending, manually-controlled lever handle 63.

A rod 64 works loosely through openings in plate 39 and shield 43 and is threaded at one end to engage in a threaded bore in the boss 55 of the plate 52 and is locked thereto by a nut 65 and its outer end is pivotally connected by a pin 66 to one of the forked arms of a bell-crank lever 67 pivotally mounted on a pin 68 mounted in the side walls of the upper part of the casing 10, the other forked end of said lever having its bifurcations pivotally connected by a pin 69 to the stem 33, whereby motion of the expanding bellows 50 acts through the rod 64 and lever 67 to move the stem 33 downwardly and hence close the valve.

The extent of opening movement of the valve is limited by the adjustment of the end plates 51 and 52 relative to each other by the turning of the sleeve-nut 59, since rotating the same in one direction causes the extention 54 to move inwardly and consequently bring the end of the bore 57 closer to the pin 56, and continued movement of the end plate 51 in this direction causes the pin 56 to engage the inner end of said bore, whereupon said plates are moved together and hence move rods 64 and 67 to shut the valve. This last action provides for the manual shut-off of the valve, while the action of the thermosensitive element under the action of the temperature of the room upon the fluid therein actuates the bellows 50 to provide for the automatic control of the valve.

The action of the thermosensitive element is resisted until the desired room temperature has been attained by spring means acting in opposition to the expansive force of said element. For this purpose a threaded tubular cap 70 is adjustably mounted in the threaded extension 24 and has a central opening in which a hollow rod 71 is loosely slidably mounted, said rod having a flanged end 72 abutting against the outer end of the rod 64 and held thereagainst by a compression spring 65 interposed between said cap and said end 72, and whose tension is adjusted by screwing the cap 70 inwardly or outwardly in the extension 24 by engagement of a suitable tool in the openings 73, a cap 74 covering the opening in said extension to prevent ready tampering with the adjustment. The stem 33 has a ring portion 75 formed therein to allow clearance for the rod 71.

The modification shown in Figs. 3 to 6, inclusive, embodies the balancing feature of the first described construction, with a different arrangement of parts, and in this form the numeral 76 designates the valve casing provided with a threaded inlet opening 77 for connection with the pipe supplying heating fluid and communicating with the interior of the casing through a valve-controlled port 78 which communicates through passages 79 with the passage 80, threaded for connection with the radiator. The inlet 77 also communicates through a passage 81 with a chamber 82.

A packless valve, similar to that previously described, controls the passage of heating fluid through the port 78 and comprises a valve disk 16', head member 17', nut 18' on the threaded extension 19' of said head and guided in the port 78, a multiple bellows diaphragm 20' secured at one end to said head member in a fluid-tight manner and at the other end to a nut 83 mounted in the threaded bore 84 of a plate 85 secured to the casing 76 by screws 86 and in turn secured to a casing section 87, of molded insulation material, by screws 88.

A valve stem 89 has a ball and socket joint connection 90 with the head member 17' and extends loosely through a partition 91 in the casing section 87 and is secured to the boss 92 of an end plate 93 of the thermosensitive element, which includes the expansible and contractible bellows 94 secured to said end plate and to an end plate 95 and which is charged, as in the first described construction, with a suitable readily volatile liquid.

The end plate 95 has a threaded extension 96 carrying a nut 97 for clamping it to a supporting cover plate 98 secured to the section 87 by screws 99 and has an inwardly extending tubular extension 100 in which a pin projection 101 of the plate 93 is loosely mounted and guided.

A lever 102 is pivotally mounted intermediate its ends on pivot pins 103 mounted in spaced lugs 104 projecting from the plate 85 and has a forked end pivotally connected by a pin 105 to the stem 89 and a forked end 106 pivotally and slidably mounted between spaced flanges 107 and 108 on rods 109 and 110, respectively.

The thermosensitive device in this form acts directly on the valve stem and valve to close the same on expansion of said device and its action is resisted by a spring 111 mounted on the rod 109 between the flange 107 and a sleeve nut 112 adjustably mounted in a threaded metal sleeve 113 in the casing 87 and carrying a cover cap 114.

The end 115 of the rod 109 fits into the flanged end 116 of the rod 110, which has a hand-wheel 117 loosely mounted thereon, having a hub portion 118 movable into abutting engagement with end 116 of the rod by the turning of a threaded portion 119 of the hub of said wheel in the threaded bore of a clamping-nut 120, which is in threaded engagement with the threaded bore 121 of the casing 76 and also acts to clamp a ring 122 to said casing to close off the end of the chamber 82, a multiple bellows diaphragm 123 being secured at one end to said ring 122 in a fluid-tight manner and similarly secured at its other end to a disk 124 having a threaded boss 125 mounted on the threaded end 126 of the rod 110.

To prevent heat from the casing 76 affecting the thermosensitive element, ventilating openings 127, 128, 129, 130, 131, 132 and 133 are provided in the casing section 87 to promote a flow of cooling air through portions of said section on both sides of the partition 91.

With this construction the pressure of the heating fluid tending to open the valve is counterbalanced by the pressure of said fluid acting on the plate 124 of like area, which through the rods 110 and 109, lever 102 and stem 89, tends to close the valve, the spring 111 acting through the rod 109, lever 102 and stem 29 to normally move the valve to open position, the thermosensitive element including bellows 94 and plates 93 and 95 acting at the desired room temperature to move stem 89 against the pressure of spring 111 to close the valve. For the manual shut-off, the turning of handwheel 117 in one direction brings the hub 118 against the end 116 and moves the rods 110 and 109 toward the left, thereby swinging lever 102 to move the stem 89 to the right to shut the valve.

The detailed showing in Fig. 7 is that of the second described construction except that instead of balancing the valve against the pressure of the supply side, the pressure of the heating medium in the radiator is balanced, the only change being that the supply inlet 134 comes into the casing 76' on the packed side of the valve and the passage 80' leading to the radiator communicates by a passage 81' with a chamber 82'. The first described form may be similarly balanced by running the passage 25 to the opposite side of the valve from that shown.

I desire it to be understood that this invention is not to be limited to any specific form or arrangement of parts except insofar as such limitations are included in the claims.

What I claim as my invention is:

1. In a device of the character described, the combination of a valve casing, a valve controlling the passage of heating fluid through said casing and having a stem, a flexible walled diaphragm connecting said valve with a portion of the casing, an expansion chamber operatively connected with the stem of said valve to close the valve, spring means operatively connected with said stem to open the valve, and means for balancing the pressure on the inlet side of the valve comprising a member operatively connected with said stem and having a flexible walled joint connection with the casing, and a chamber surrounding said member and in communication with the inlet side of the casing.

2. In a device of the character described, the combination of a valve casing, a valve controlling the passage of heating fluid through said casing and having a stem sealed against the fluid controlled by said valve, a laterally disposed expansion chamber carried by the casing, a spring alined with the axis of said expansion chamber and opposing its expansion, means including a lever operatively connecting said spring and expansion chamber with the stem of said valve, a chamber surrounding the outer portion of said stem, a pressure-balancing member mounted on the outer end of said stem and having a flexible walled joint connection with said casing, said casing having a passage connecting the inlet side of said casing with said chamber.

3. In a device of the character described, the combination of a valve casing, a valve controlling the inlet of heating fluid to said casing having a stem sealed against the fluid controlled by said valve, an expansion chamber associated with said stem, balancing means including a chamber communicating with one side of the valve, and a pressure-transmitting connection including a rod having a packless joint connection with the walls of said chamber and a lever connecting said rod with the stem of said valve, and spring means acting on said rod for opening said valve.

In testimony whereof, I affix my signature.

FREDERICK W. JAEGER.